(12) United States Patent
O'Brien et al.

(10) Patent No.: US 11,704,293 B2
(45) Date of Patent: *Jul. 18, 2023

(54) METHOD AND SYSTEM FOR CREATING AND MAINTAINING A DATA HUB IN A DISTRIBUTED SYSTEM

(71) Applicant: Anaplan, Inc., San Francisco, CA (US)

(72) Inventors: Connor Jack O'Brien, San Francisco, CA (US); Bryon L. Mikowicz, San Francisco, CA (US); Hillary Harnett, San Francisco, CA (US); Joseph Michael Morisette, Fort Worth, TX (US); Pierre Romil Kerkinni, Brooklyn Park, MN (US); Prakash Hariharan, Frisco, TX (US)

(73) Assignee: ANAPLAN, INC., San Francisco, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/349,186

(22) Filed: Jun. 16, 2021

(65) Prior Publication Data

US 2021/0311920 A1    Oct. 7, 2021

Related U.S. Application Data

(63) Continuation of application No. 16/176,690, filed on Oct. 31, 2018, now Pat. No. 11,074,233.

(51) Int. Cl.
*G06F 16/215*    (2019.01)
*G06F 16/23*    (2019.01)
*G06F 16/242*    (2019.01)
*G06F 16/25*    (2019.01)

(52) U.S. Cl.
CPC ........ *G06F 16/215* (2019.01); *G06F 16/2365* (2019.01); *G06F 16/244* (2019.01); *G06F 16/254* (2019.01)

(58) Field of Classification Search
CPC .. G06F 16/215; G06F 16/244; G06F 16/2365; G06F 16/254; G06F 16/235; G06F 16/258; G06F 17/18; G06N 5/022; G06N 5/025; G06N 5/04
USPC ................................................. 707/692, 603
See application file for complete search history.

(56) References Cited

U.S. PATENT DOCUMENTS

| | | | |
|---|---|---|---|
| 2009/0313041 A1* | 12/2009 | Eder | G16H 50/20 705/2 |
| 2012/0005527 A1 | 1/2012 | Engel et al. | |
| 2017/0236060 A1* | 8/2017 | Ignatyev | G06F 16/2365 706/46 |
| 2018/0157552 A1* | 6/2018 | Kaur | G05B 23/0221 |
| 2019/0124104 A1 | 4/2019 | Apostolopoulos | |

* cited by examiner

*Primary Examiner* — Evan Aspinwall
(74) *Attorney, Agent, or Firm* — Chamberlain, Hrdlicka, White, Williams, & Aughtry

(57) ABSTRACT

A data hub for servicing data hub dependent data consumers includes a persistent storage and a data validator. The persistent storage stores validated data. The data validator obtains a data validation request; in response to obtaining the data validation request: imports data from a data aggregator to obtain the validated data; performs a continuity analysis of the validated data to generate a data deviation report; and provides a portion of the validated data to one of the data hub dependent data consumers.

20 Claims, 14 Drawing Sheets

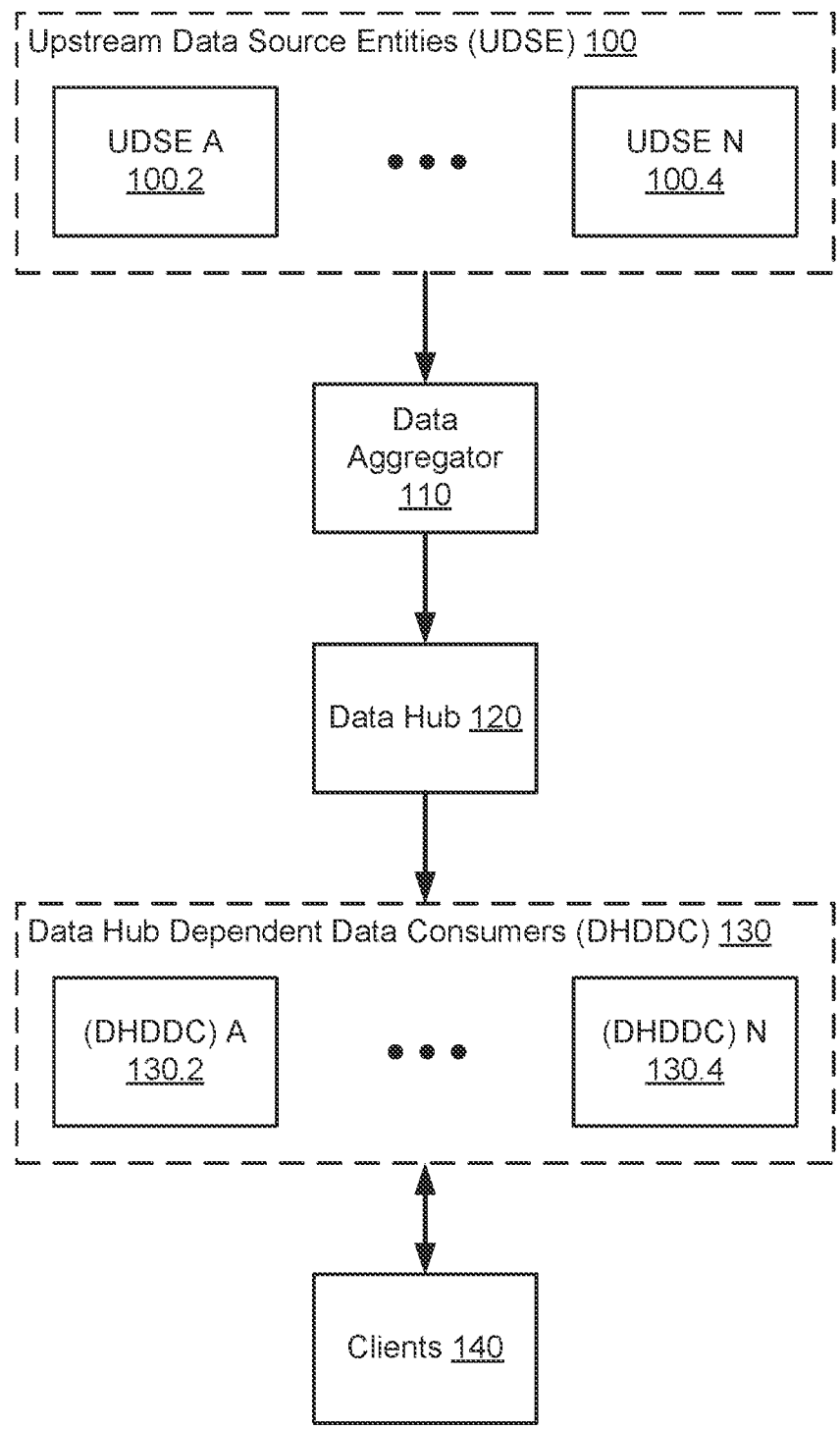
FIG. 1.1

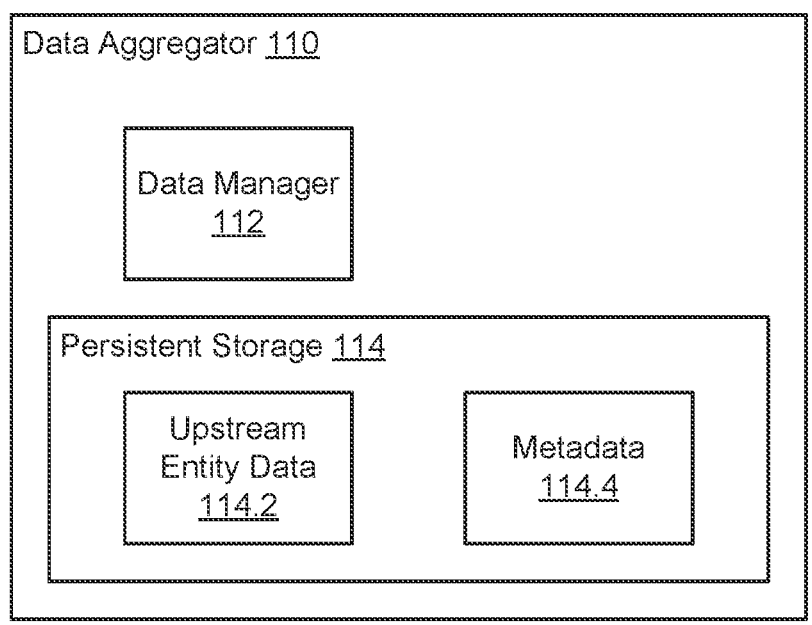
FIG. 1.2

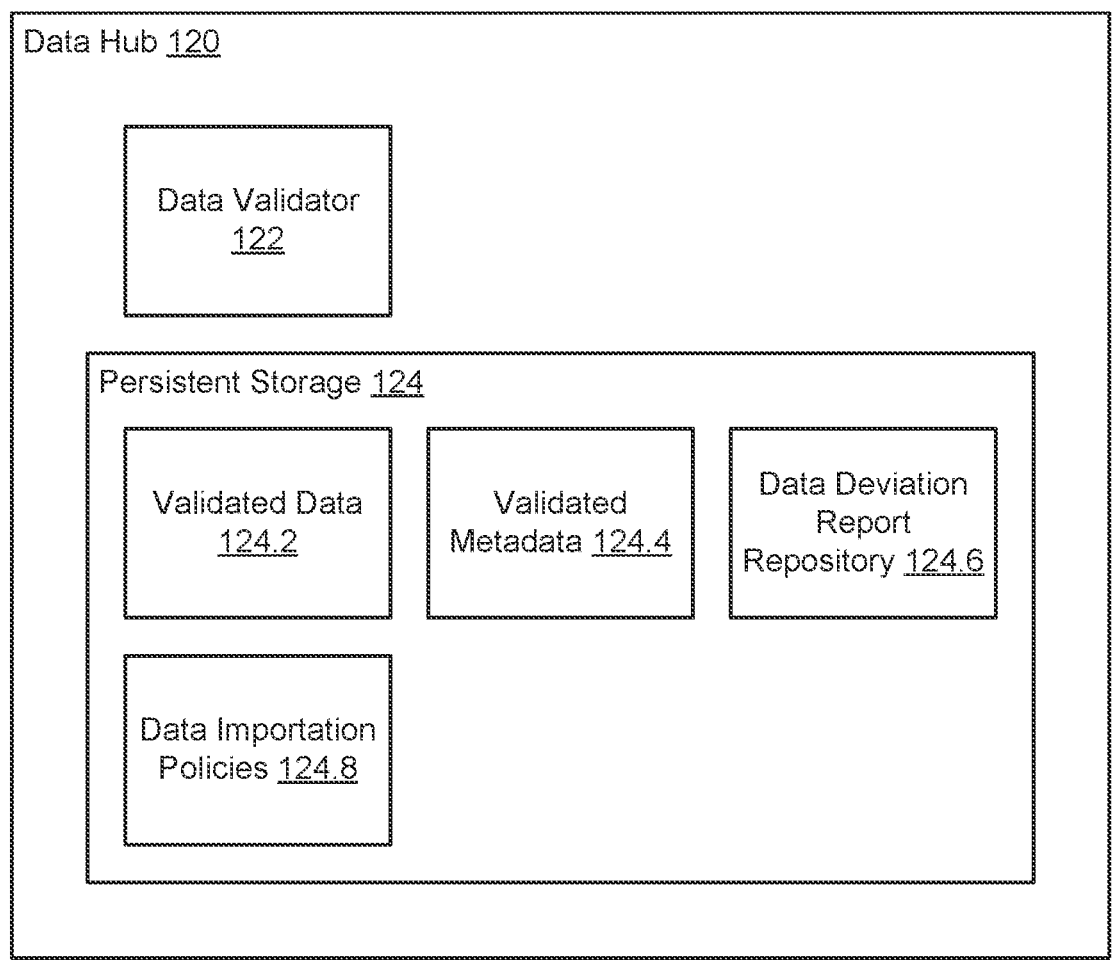
FIG. 1.3

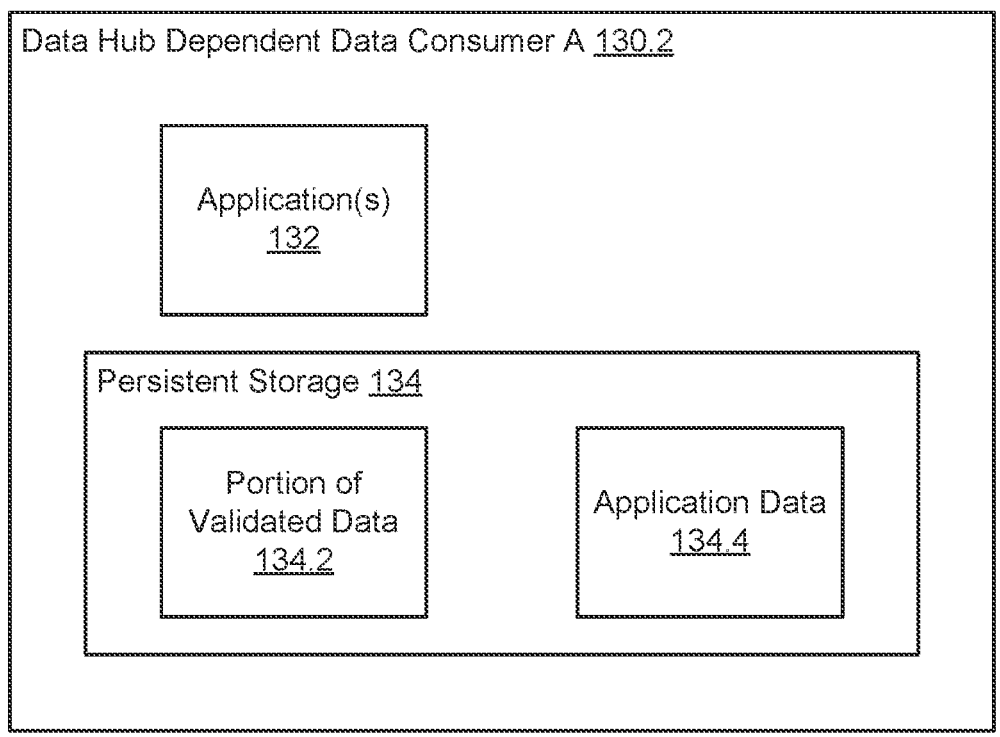
FIG. 1.4

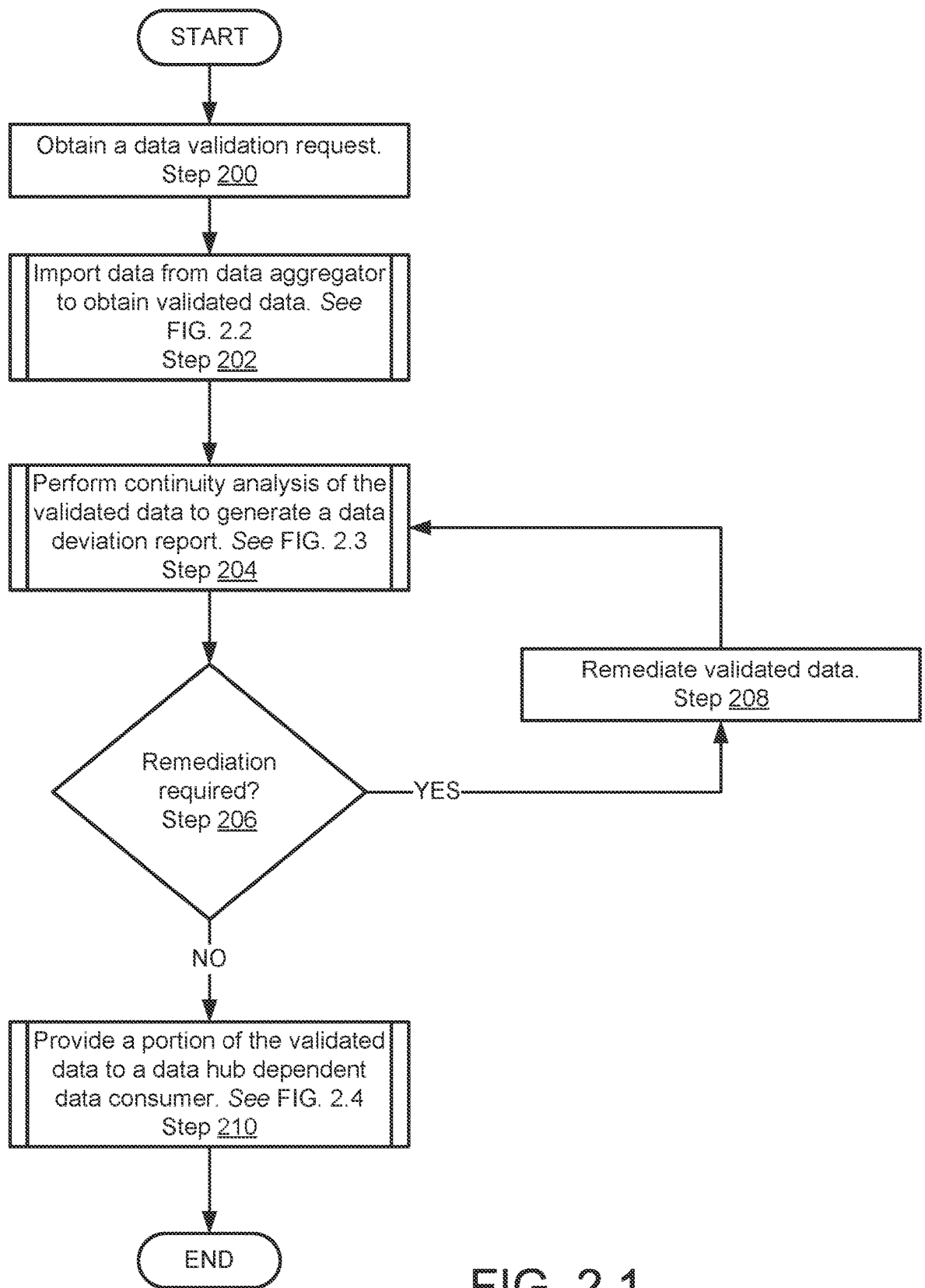
FIG. 2.1

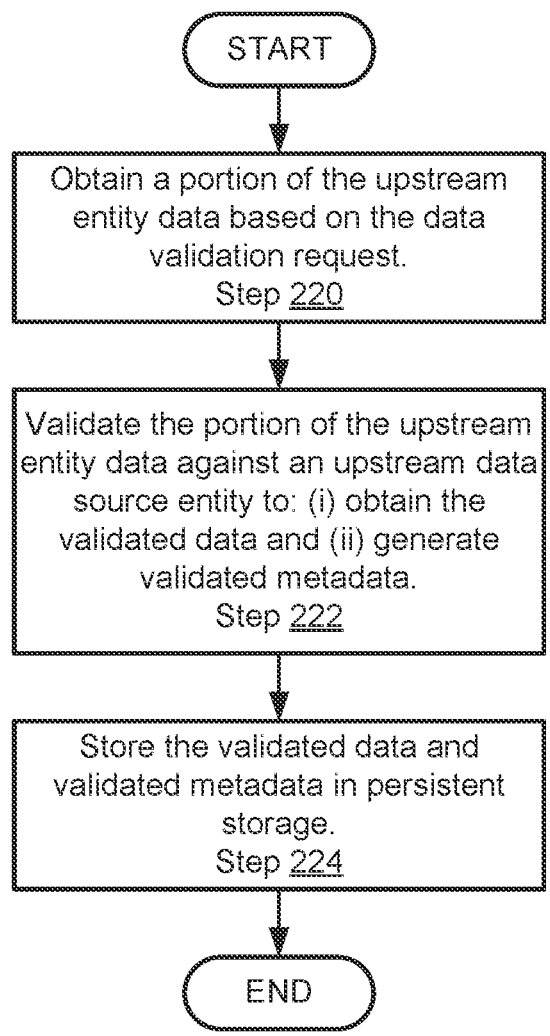
FIG. 2.2

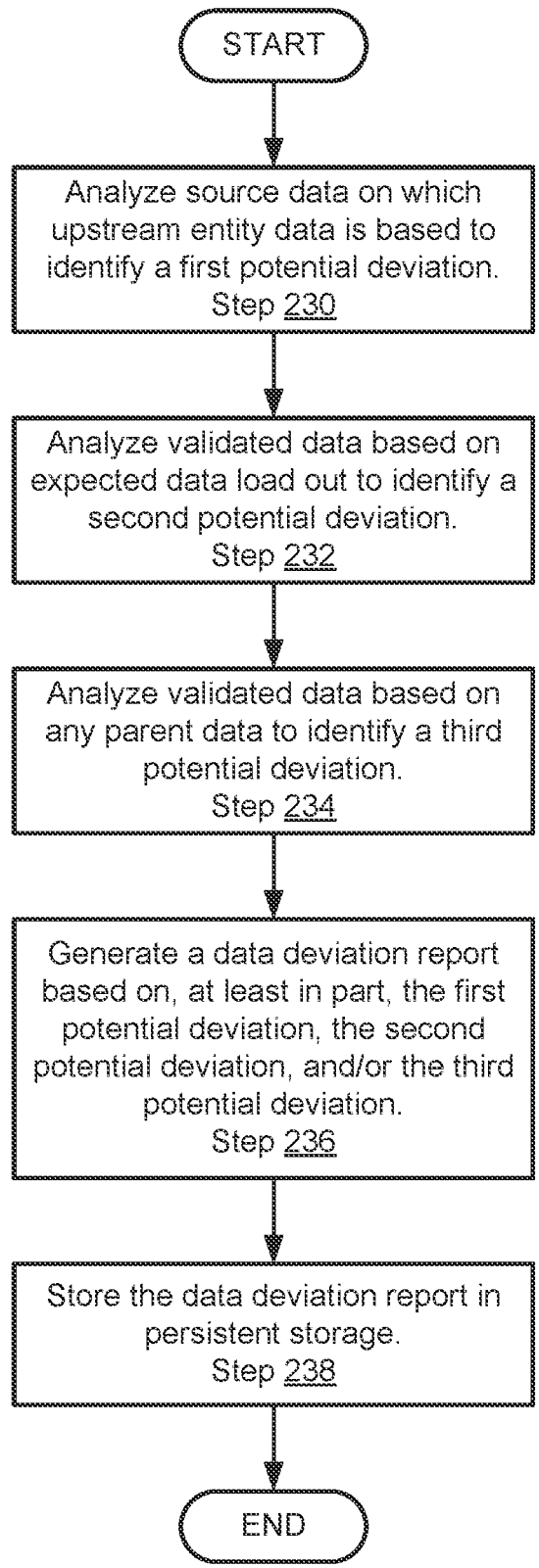
FIG. 2.3

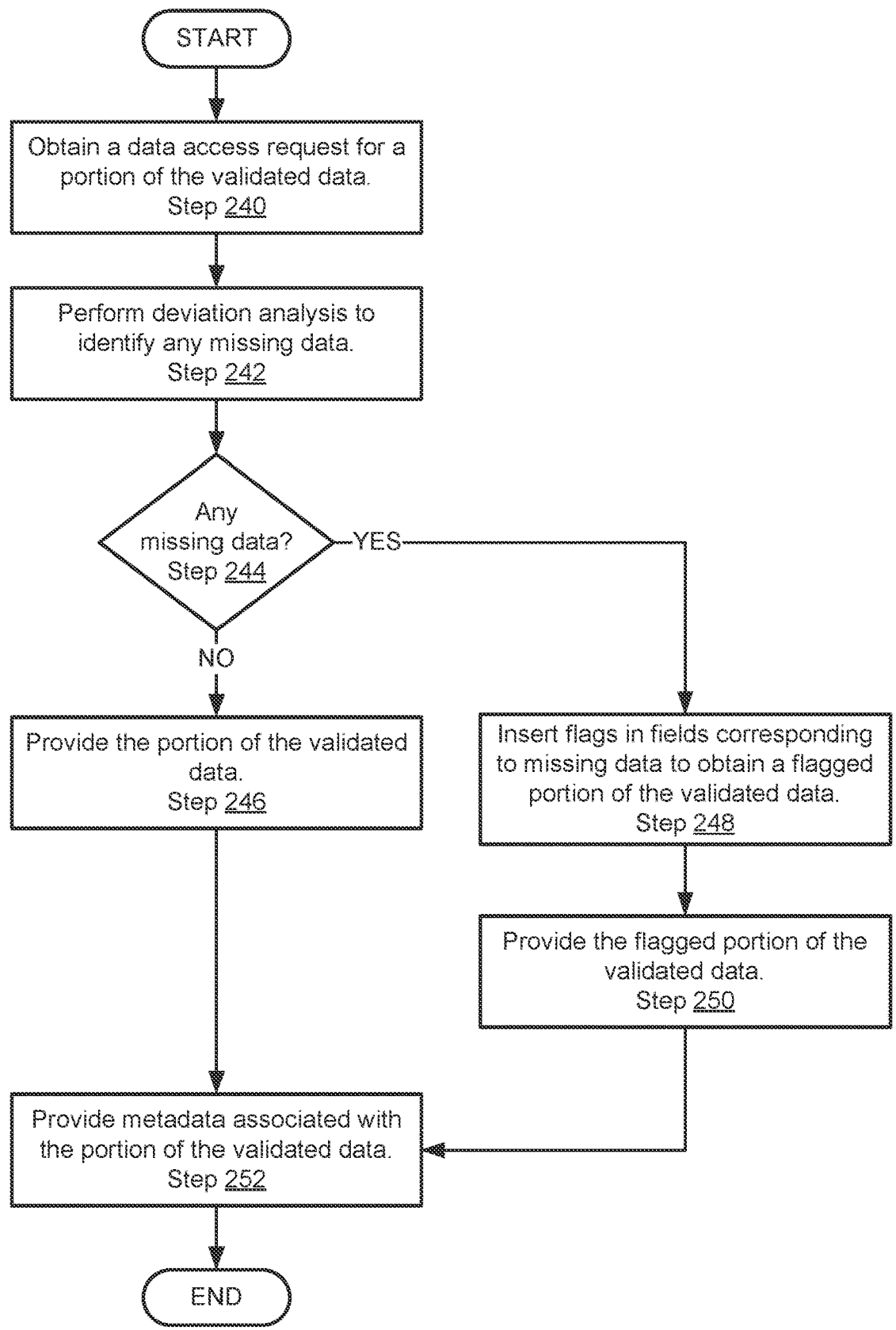
FIG. 2.4

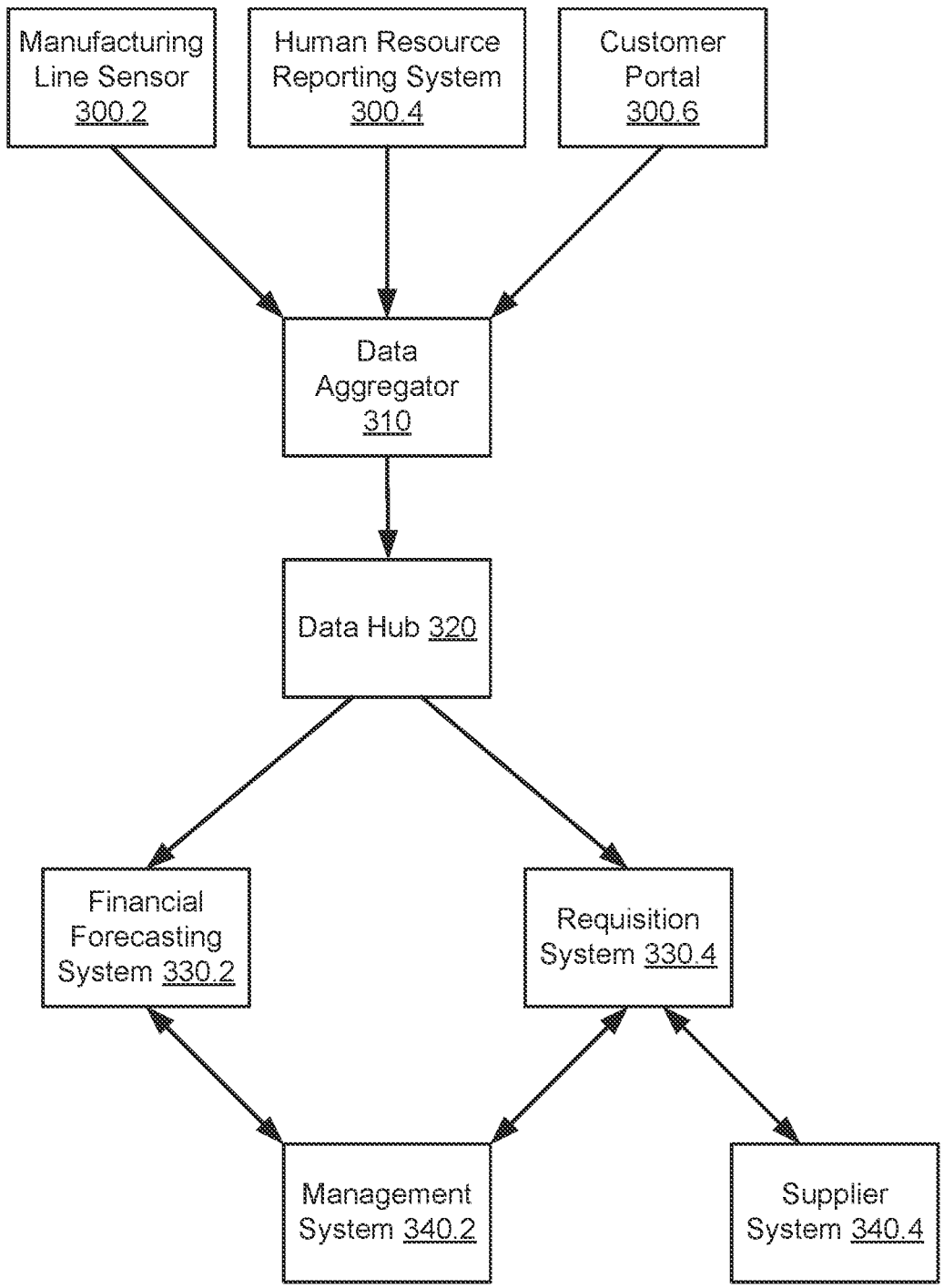
FIG. 3.1

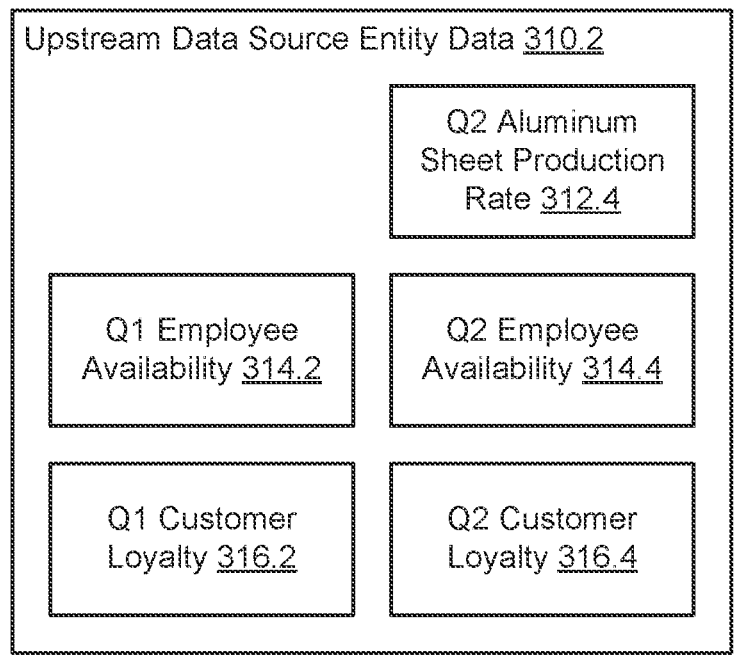
FIG. 3.2

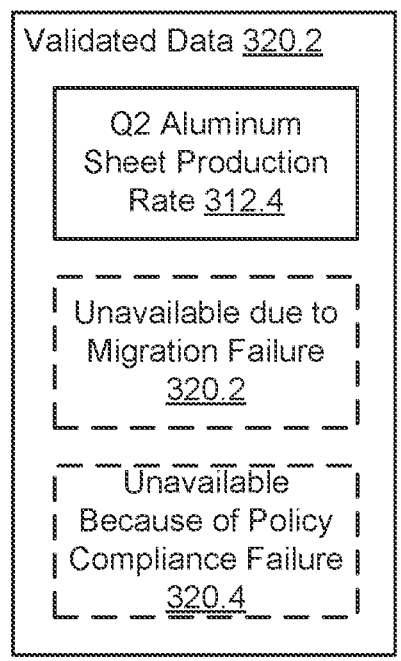
FIG. 3.3

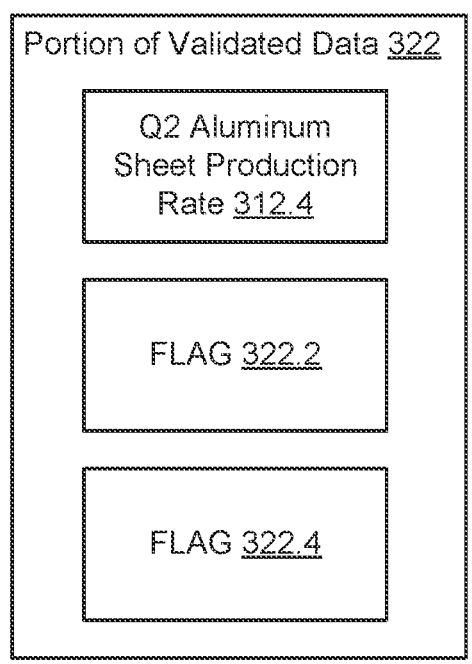
FIG. 3.4

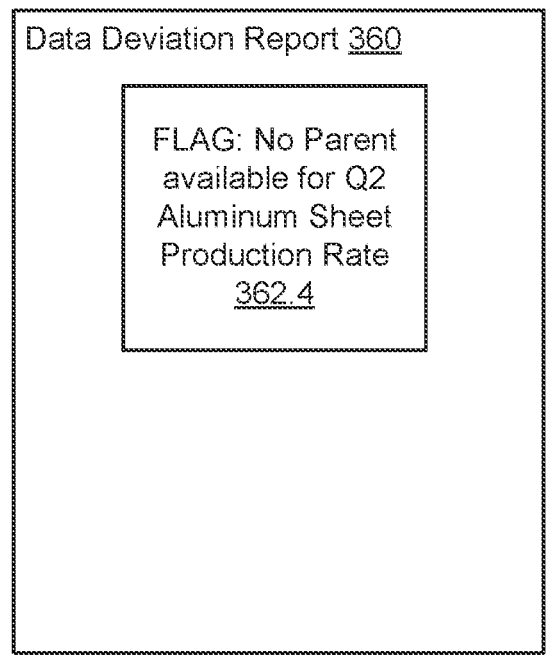
FIG. 3.5

METHOD AND SYSTEM FOR CREATING AND MAINTAINING A DATA HUB IN A DISTRIBUTED SYSTEM

CROSS-REFERENCE TO RELATED APPLICATIONS

This application is a continuation application of U.S. patent application Ser. No. 16/176,690, filed on Oct. 31, 2018, and entitled "METHOD AND SYSTEM FOR CREATING AND MAINTAINING A DATA HUB IN A DISTRIBUTED SYSTEM". Accordingly, this application claims benefit of U.S. patent application Ser. No. 16/176,690 under 35 U.S.C. § 120. U.S. patent application Ser. No. 16/176,690 is hereby incorporated by reference in its entirety.

BACKGROUND

Distributed systems process data to provide desired functionality to users of the distributed system. Any computing device in a distributed system may be required to process any amount of data. As the quantity of data in a distributed system increases, it becomes progressively more difficult for any node of the distributed system to process the data because of computing resource limitations. Further, validation of the data, prior to processing, incurs additional computational resource overhead. The additional computational resource overhead for data validation may grow linearly, exponentially, logarithmically, or in other manners making data validation a large consumer of computing resources in a distributed system.

SUMMARY

In one aspect, a data hub for servicing data hub dependent data consumers in accordance with one or more embodiments of the invention includes a persistent storage and a data validator. The persistent storage stores validated data. The data validator obtains a data validation request; in response to obtaining the data validation request: imports data from a data aggregator to obtain the validated data; performs a continuity analysis of the validated data to generate a data deviation report; and provides a portion of the validated data to one of the data hub dependent data consumers.

In one aspect, a method for servicing data hub dependent data consumers in accordance with one or more embodiments of the invention includes obtaining a data validation request; in response to obtaining the data validation request: importing data from a data aggregator to obtain validated data; performing a continuity analysis of the validated data to generate a data deviation report; storing the validated data in a persistent storage of a data hub; and providing a portion of the validated data to one of the data hub dependent data consumers.

In one aspect, a non-transitory computer readable medium in accordance with one or more embodiments of the invention includes computer readable program code, which when executed by a computer processor enables the computer processor to perform a method for servicing data hub dependent data consumers. The method includes obtaining a data validation request; in response to obtaining the data validation request: importing data from a data aggregator to obtain validated data; performing a continuity analysis of the validated data to generate a data deviation report; storing the validated data in a persistent storage of a data hub; and providing a portion of the validated data to one of the data hub dependent data consumers.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a data aggregator in accordance with one or more embodiments of the invention.

FIG. 1.3 shows a diagram of a data hub in accordance with one or more embodiments of the invention.

FIG. 1.4 shows a diagram of a data hub dependent data consumer in accordance with one or more embodiments of the invention.

FIG. 2.1 shows a flowchart of a method of providing validated data in accordance with one or more embodiments of the invention.

FIG. 2.2 shows a flowchart of a method of importing data in accordance with one or more embodiments of the invention.

FIG. 2.3 shows a flowchart of a method of performing a continuity analysis in accordance with one or more embodiments of the invention.

FIG. 2.4 shows a flowchart of a method of providing a portion of validated data to a data hub dependent data consumer in accordance with one or more embodiments of the invention.

FIG. 3.1 shows a diagram of an example system.

FIG. 3.2 shows a diagram of upstream data source entity data in the system of FIG. 3.1.

FIG. 3.3 shows a diagram of validated data based on the upstream data source entity data of FIG. 3.2.

FIG. 3.4 shows a diagram of a portion of the validated data of FIG. 3.3.

FIG. 3.5 shows a diagram of a data deviation report based on the validated data of FIG. 3.3.

DETAILED DESCRIPTION

Figure 4:
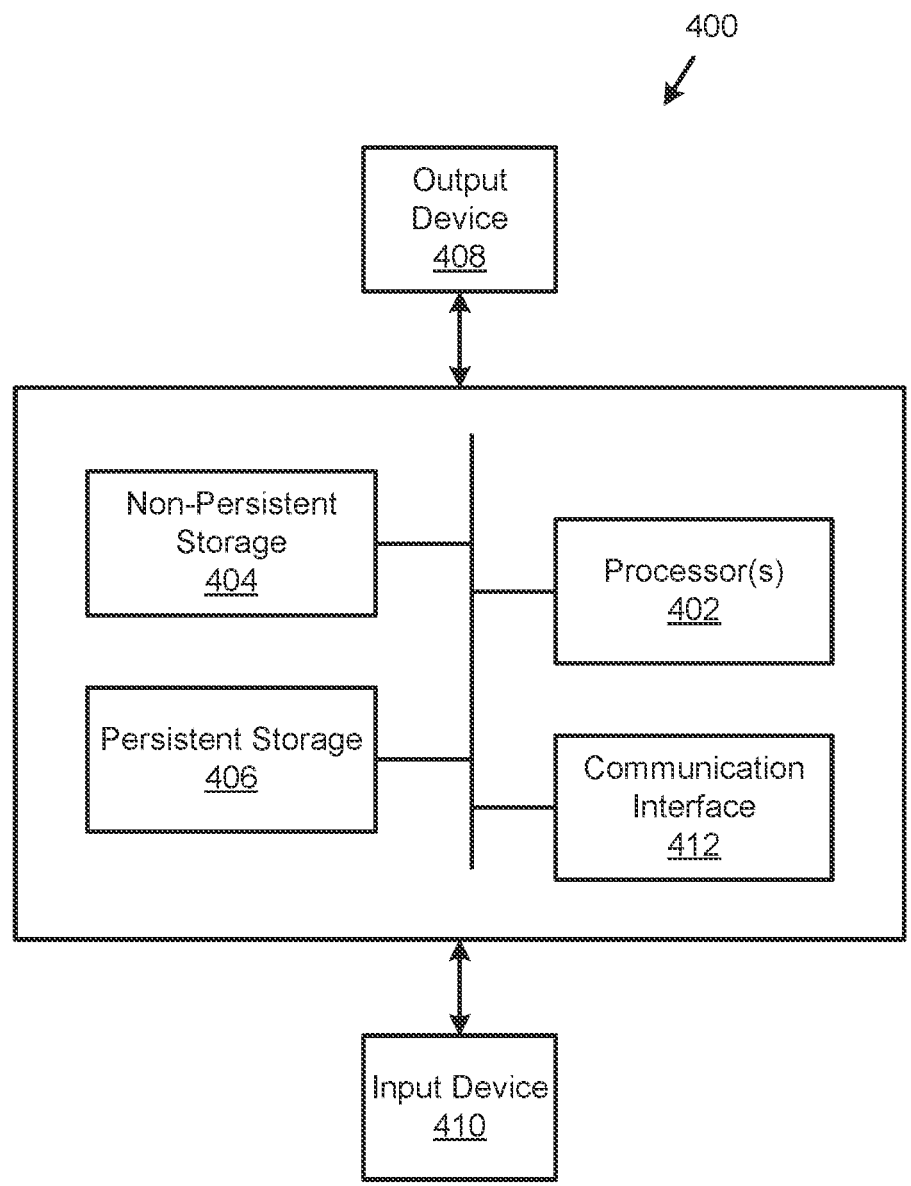
FIG. 4 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for operating a distributed system. More specifically, embodiments of the invention provide a distributed system that segregates the performance of different portions of the computation across different portions of the distributed system. By doing so, embodiments of the invention may provide a more computationally efficient distributed system that provides more consistent amputation results than contemporary distributed systems.

In one or more embodiments of the invention, a data hub of the distributed system validates data used by downstream entities within the distributed system. The downstream entities may make certain assumptions regarding the validated data which allows the downstream entities perform computations more efficiently and contemporary distributed systems.

Additionally, in one or more embodiments of the invention, the data hub of the distributed system performs validation of data based on data importation policies. These policies may reflect certain assumptions made by downstream entities regarding both the format and content of data included in the validated data. By performing validation using these policies, data validation may be separated from computations performed on validated data, thereby enabling the efficient distribution of different portions of computations across a distributed system.

FIG. 1 shows an example system in accordance with one or more embodiments of the invention. The system may include upstream data source entities (100) that generate data. The data may be of any type and include any content. The system may further include a data aggregator (110) that obtain the data from the upstream data source entities (100). For example, the data aggregator (110) may receive data from the upstream data source entities (100) and/or may actively monitor the obtained data from the upstream data source entities (100).

The system may further include a data hub (120) that selectively obtains data from the data aggregator (110), validates the obtained data, and provides portions of the obtained data to data hub dependent data consumers (130). The data hub dependent data consumers (130) may generate new data based on the data provided by the data hub (120). The data hub dependent data consumers (130) may make certain assumptions regarding the content, format, and/or other characteristics of the portions of the data provided by the data hub (120). Based on these assumptions, the data hub dependent data consumers (130) may not perform some traditionally performed data validation operations for generating new data using the portions of the data. By doing so, the computational cost of generating new data based on the portions of the data provided by the data hub (120) may be reduced when compared to contemporary methods for generating data.

The data hub dependent data consumers (130) may provide the newly generated data to clients (140) and/or other entities. The clients (140) may be consumers of data generated by the data hub dependent data consumers (130). The newly generated data produced by any of the data hub dependent data consumers (130) may be consistent in that each of the data hub dependent data consumers rely on the same data repository, e.g., the data hub (120).

The components of the system illustrated in FIG. 1.1 may be operably connected to each other and/or other entities (not shown) via any combination of wired and/or wireless networks. Each component of the system illustrated in FIG. 1.1 is discussed below.

The upstream data source entities (100) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 2.1-2.4. The upstream data source entities (100) may be other types of computing devices without departing from the invention. For additional details regarding computing devices, refer to FIG. 4.

The upstream data source entities (100) may be logical devices without departing from the invention. For example, the upstream data source entities (100) may be virtual machines that utilize computing resources of any number of physical computing devices to provide the functionality of the upstream data source entities (100).

In one or more embodiments of the invention, the upstream data source entities (100) generate data that may be used by downstream entities, e.g., data hub dependent data consumers (130). The upstream data source entities (100) may generate any type of data.

For example, the content of the data may relate to sensor readings obtained by one or more sensors. The sensors may be any type of sensor that is capable of obtaining any type of information from the real world. The sensors may be operably connected to the data aggregator (110) and provide sensor readings via the operable connection. The sensor readings may be provided in real time, aggregated and provided in batches, or provided via any other method.

In another example, the content of the data may relate to characteristics of an organization. The characteristics of the organization may be sales information, employment information, human resource information, financial information, or any other type of characteristic of an organization. Such information may be provided at any level of granularity. In some embodiments of the invention, such information may be provided in a flat format. That is, in a format that reflects the current state of an upstream data source entity without including rich contextual information such as, for example, time information (e.g., generation time, time relationship, expiration time, etc.)

In a still further example, the content of the data may relate to characteristics of a network environment in which the upstream data source entities (100) are operating. The characteristics of the network environment may indicate whether certain types of data may be obtained or are prevented from being obtained due to the conductivity state of the network environment.

The content of the data may also relate to characteristics of other organizations for entities. For example, the content of the data may be generated by other systems that include any number of other distributed devices. Consider a scenario in which multiple systems as illustrated in FIG. 1.1 operate concurrently. Periodically, these systems may update the other systems with relevant information regarding respective system. By doing so, a distributed system of multiple distributed systems may cooperate complete a coordinated task.

In one or more embodiments of the invention, each of the upstream data source entities (100) includes functionality to provide generated data to the data aggregator (110). For example, each of the upstream data source entities (100) may queue data for transmission to the data aggregator (110) as it is generated. In another example, each of the upstream data source entities (100) may track of data that has not been provided to the data aggregator (110). The data aggregator (110) may periodically request that data that has not been provided to the data aggregator (110) be provided. In response, the upstream data source entities may provide the tract data that is not been provided to the data aggregator (110).

The system may include any number of upstream data source entities (100) without departing from the invention. For example, the system may include a single upstream data source entity A (100.2) or multiple upstream data source entities (e.g., 100.2, 100.4).

Additionally, while illustrated as separate entities from that of other components of the system, any of the components of the system of FIG. 1.1 may be an upstream data source entity in addition to providing its respective functionality. For example, the clients (140) may be upstream data source entities.

The data aggregator (110) may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 2.1-2.4. The data aggregator (110) may be other types of computing devices without departing from the invention. For additional details regarding computing devices, refer to FIG. 4.

The data aggregator (110) may be logical devices without departing from the invention. For example, the data aggregator (110) may be virtual machines that utilize computing resources of any number of physical computing devices to provide the functionality of the data aggregator (110).

In one or more embodiments of the invention, the data aggregator (110) provides data warehousing services for data from the upstream data source entities (100). The data aggregator (110) may provide data warehousing services by obtaining data from the upstream data source entities (100) and storing the obtained data. The data aggregator (110) may provide the stored data to other entities such as, for example, data hub dependent data consumers (130). For additional details regarding the data aggregator (110), refer to FIG. 1.2.

The data hub (120) may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 2.1-2.4. The data hub (120) may be other types of computing devices without departing from the invention. For additional details regarding computing devices, refer to FIG. 4.

The data hub (120) may be logical devices without departing from the invention. For example, the data hub (120) may be virtual machines that utilize computing resources of any number of physical computing devices to provide the functionality of the data hub (120).

In one or more embodiments of the invention, the data hub (120) generates validated data. Validated data may be in a predetermined format and include a predetermined content. The predetermined format and determine content may be assumptions upon which downstream entities rely to efficiently perform computations using the validated data. For example, the downstream entities may not include functionality to check the content and/or the format of the validated data. By doing so, the downstream entities may perform computations more efficiently and generate results that are more consistent with other downstream entities then contemporary methods for performing computations in a distributed system.

In one or more embodiments of the invention, the data hub (120) generates validated data using data obtained from the data aggregator (110) or other entities. For example, the data hub (120) may store copies of the data from other entities and filter the data to obtain the validated data. The filtering may be performed on demand, i.e., when another entities requests the validated data, or at a predetermined point in time. The predetermined point in time may be, for example, when the data from the data aggregator (110) or other entities is initially obtained. In some embodiments of the invention, copies of the data upon which the validated data is based may be deleted from the data hub (120) after filtering. In other words, data from other entities may be filtered to obtain the validated data and only the validated data may be stored in the data hub (120). For additional details regarding the data hub (120), refer to FIG. 1.3.

The data hub dependent data consumers (130) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 2.1-2.4. The data hub dependent data consumers (130) may be other types of computing devices without departing from the invention. For additional details regarding computing devices, refer to FIG. 4.

The data hub dependent data consumers (130) may be logical devices without departing from the invention. For example, the data hub dependent data consumers (130) may be virtual machines that utilize computing resources of any number of physical computing devices to provide the functionality of the data hub dependent data consumers (130).

In one or more embodiments of the invention, the data hub dependent data consumers (130) generate data using validated data from the data hub (120). For example, each of the data hub dependent data consumers (130) may generate reports, generate application data, or otherwise provide computer implement it services that generate relevant data using the validated data from the data hub (120).

In one or more embodiments of the invention, the data hub dependent data consumers (130) assume that the validated data will meet specific content and format requirements. By doing so, the data hub dependent data consumers (130) may perform computations on the validated data in a manner that is more computationally efficient when compared with contemporary methods that rely on rich and detailed format and/or content checking. Thus, embodiments of the invention may address the problem of limited computational resources in a distributed environment. Specifically, embodiments of the invention may provide a specific arrangement for performing a distributed computation in a distributed environment In one or more embodiments of the invention, the data hub dependent data consumers (130) generate consistent data using the validated data. For example, because each of the data hub dependent data consumers (130) perform computations using the same data set, the results of these computations are consistent with each other. In contrast, contemporary methods performing computations in a distributed system may not provide consistent results because of the use of multiple, independent, and/or inconsistent data sets as the basis for the computations. Thus, embodiments of the invention may address the problem of consistency of complication result in a distributed system.

The system of FIG. 1.1 may include any number of data hub dependent data consumers (130) without departing from the invention. The system may include a single data hub dependent data consumer A (130.2) or multiple data hub dependent data consumers (e.g., 130.2, 130.4).

Additionally, while illustrated in FIG. 1.1 as providing newly generated data to the clients (140), the data hub dependent data consumers (130) may provide newly generated data any of the entities of FIG. 1.1 and/or other entities that illustrated in FIG. 1.1 without departing from the invention. For additional details regarding the data hub dependent data consumers (130), refer to FIG. 1.3.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 2.1-2.4. The clients (140) may be other types of computing devices without departing from the invention. For additional details regarding computing devices, refer to FIG. 4.

The clients (140) may be logical devices without departing from the invention. For example, the clients (140) may be virtual machines that utilize computing resources of any number of physical computing devices to provide the functionality of the clients (140).

In one or more embodiments of the invention, the clients (140) utilize data generated by the data hub dependent data consumers (130). For example, the clients (140) may perform actions based on the data generated by the data hub dependent data consumers (130). Consider a scenario in which one of the clients (140) provides resource management services to other entities. This scenario, the client may obtain information relevant to management of the resources from the data hub dependent data consumers (130) and take action based on relevant information to manage the resources.

The clients (140) may utilize the data generated by the data hub dependent data consumers (130) for any purpose without departing from the invention.

While the system of FIG. 1.1 has been described and illustrated as including a limited number of components for the sake of brevity, a system in accordance with embodiments of the invention may include additional, fewer, and/or different components than those illustrated in FIG. 1.1 without departing from the invention.

To further clarify aspect of embodiments of the invention as shown in FIG. 1.1, an example description of how data may flow through the system of FIG. 1.1 is provided. Consider a scenario in with the upstream data source entities (100) are generating data such as the rate of product defects in a manufacturing line, the number of workers working on the manufacturing line, and the cost of operating the manufacturing line. The data aggregator (110) may obtain copies of this data at various points in time and store the copies in persistent storage. By doing so, time dependent data may be generated over time. The data hub dependent data consumers (130) may utilize this data to perform computations such as, for example, report generation. For example, a one of the data hub dependent data consumers (130) may calculate profitability of the manufacturing line over time using the product defect rate, the number of workers, and the cost of operating the manufacturing line, in addition to other information no specifically discussed here. To reduce the cost of performing such computations, the data hub dependent data consumers (130) may not obtain the data directly from the upstream data source entities (100). Rather, the data hub dependent data consumers (130) may obtain validated data, rather than the data itself, from the data hub (120). The data hub (120) may pre-process the data to ensure the consistency and accuracy of the data. By doing so, all of the data hub dependent data consumers (130) may: (i) rely on the data hub (120) to validate the data and (ii) use the same data for performance of computations. In this manner, the data hub (120) may operate as a global data validator for the distributed system which enables the data hub dependent data consumers (130) to perform their respective functions in a manner that is consistent with the way in which each of the data hub dependent data consumers (130) perform their respective functions.

As discussed above, the data aggregator (110) may provide data warehousing services for data from the upstream data source entities (100). FIG. 1.2 shows a diagram of the data aggregator (110) in accordance with one or more embodiments of the invention.

In one or more embodiments of the invention, the data aggregator (110) aggregates data from any number of upstream data source entities, e.g., provides data warehousing services. The data may be of any type and/or quantity. In one or more embodiments of the invention, the data aggregator (110) generates and stores metadata regarding the data obtained from the upstream data source entities. For example, the data aggregator (110) may store information regarding time at which data was obtained from the upstream data source entities, information regarding a type of the data, information regarding the content of the data, information regarding limitations on the use of the data, information regarding other data upon which the upstream data source entities generated the data, and/or any other information regarding the data obtained from the upstream data source entities.

To provide the above-noted functionality of the data aggregator (110), the data aggregator (110) may include a data manager (112) and persistent storage (114). Each of these components of the data aggregator (110) is discussed below.

In one or more embodiments of the invention, the data manager (112) obtains data from upstream data source entities, generates metadata regarding the obtained data, and stores both the data and metadata in the persistent storage (114). For example, the data manager (112) may obtain upstream entity data (114.2), generate metadata (114.4) regarding the upstream entity data (114.2), and store both of these data structures in the persistent storage (114).

In one or more embodiments of the invention, the data manager (112) provides previously stored data and/or metadata to a data hub. For example, the data manager (112) may provide such data in accordance with a schedule, a request and reply system, a subscription system, or any other type of system for providing data to other entities.

In one or more embodiments of the invention, the data manager (112) may keep track of data provided to a data hub. By doing so, the data manager (112) may be able to identify any data that has not been provided to the data hub previously. For example, the data manager (112) may include a field in the metadata (114.4) indicating whether any portions of the upstream entity data (114.2) have not been provided to the data hub. Thus, the data manager (112) may identify portions of the upstream entity data (114.2), or other data structures stored in persistent storage (114), that have not been provided to the data hub.

In one or more embodiments of the invention, the data manager (112) is a hardware device including circuitry. The data manager (112) may be, for example, a digital signal processor, a field programmable gate array, or an application specific integrated circuit. The data manager (112) may be other types of hardware devices without departing from the invention.

In one or more embodiments of the invention, the data manager (112) is implemented as computing code stored on a persistent storage that when executed by a processor performs the functionality of the data manager (112). The processor may be a hardware processor including circuitry such as, for example, a central processing unit or a microcontroller. The processor may be other types of hardware devices for processing digital information without departing from the invention.

In one or more embodiments of the invention, the persistent storage (114) is a data storage device. For example, the persistent storage (114) may be any combination of hard disk drives, solid state disk drives, tape drives, and/or any other physical storage medium for the storage of data.

In one or more embodiments of the invention, the persistent storage (114) stores upstream entity data (114.2) and metadata (114.4). Each of these data structures is described below.

In one or more embodiments of the invention, the upstream entity data (114.2) is a data structure that includes data reflective of data obtained from upstream data source entities. The upstream entity data (114.2) include data from any number of upstream data source entities and may include any quantity of data.

In one or more embodiments of the invention, the metadata (114.4) is a data structure that includes information regarding the upstream entity data (114.2). The metadata (114.4) may include any type and quantity of data regarding the upstream entity data (114.2). Additionally, the metadata (114.4) may specify information regarding the upstream entity data (114.2) at any level of granularity without departing from the invention. For example, the metadata (114.4) may include a first field that indicates that the upstream entity data (114.2) is associated with a particular point in time. In another example the metadata (114.4) may include a second field that indicates that one field included in the upstream entity data (114.2) is associated with a particular upstream data source entity.

While the persistent storage (114) has been illustrated as including a limited number of data structures that are stored in a specific format, the persistent storage (114) may include additional, different, and/or less data the net illustrated in FIG. 1.2 without departing from the invention. Additionally, while the data structures illustrated in FIG. 1.2 are illustrated as being separate them other types of data, these data structures may be integrated into other data structures; include additional, different, and/or less data the described above; and/or may be subdivided into any number of data structures without departing from the invention. Further, while the data structures illustrated in FIG. 1.2 are shown as being stored in a persistent storage of the data aggregator (110), these data structures may be stored in other locations (e.g., remote), spanned across any number of computing devices, and/or shared with any number of other entities without departing from the invention.

While the data aggregator (110) of FIG. 1.2 has been described and illustrated as including a limited number of components for the sake of brevity, a data aggregator (110) in accordance with embodiments of the invention may include additional, fewer, and/or different components than those illustrated in FIG. 1.2 without departing from the invention.

As discussed above, the data hub (120) may provide data to downstream entities. FIG. 1.3 shows a diagram of the data hub (120) in accordance with one or more embodiments of the invention.

In one or more embodiments of the invention, the data hub (120) generates validated data (124.2), validated metadata (124.4), and data deviation reports. The data hub (120) may provide some, or all, of these data structures to downstream entities.

To provide the above-noted functionality of the data hub (120), the data hub (120) may include a data validator (122) and a persistent storage (124). Each of these components of the data aggregator (110) is discussed below.

In one or more embodiments of the invention, the data validator (122) obtains data from the data aggregator, generates validated data (124.2) and/or validated metadata (124.4) using the obtained data, and generates data deviation reports based on the validated data (124.2) and/or data importation policies (124.8). To provide this functionality, the data validator (122) may perform all, or a portion, of the methods illustrated in FIGS. 2.1-2.4.

In one or more embodiments of the invention, the data validator (122) is a hardware device including circuitry. The data validator (122) may be, for example, a digital signal processor, a field programmable gate array, or an application specific integrated circuit. The data validator (122) may be other types of hardware devices without departing from the invention.

In one or more embodiments of the invention, the data validator (122) is implemented as computing code stored on a persistent storage that when executed by a processor performs the functionality of the data validator (122). The processor may be a hardware processor including circuitry such as, for example, a central processing unit or a microcontroller. The processor may be other types of hardware devices for processing digital information without departing from the invention.

In one or more embodiments of the invention, the persistent storage (124) is a data storage device. For example, the persistent storage (124) may be any combination of hard disk drives, solid state disk drives, tape drives, and/or any other physical storage medium for the storage of data.

In one or more embodiments of the invention, the persistent storage (124) stores validated data (124.2), validated metadata (124.4), a data deviation report repository (124.6), and/or data importation policies (124.8). Each of these data structures is described below.

In one or more embodiments of the invention, the validated data (124.2) is a data structure that includes data that the data validator (122) has validated. The validated data (124.2) may be generated in accordance with data importation policies (124.8). The validated data (124.2) include a subset of the data included in a data aggregator. For example, the data importation policies (124.8) may prevent some of the data in the data aggregator from being used to generate validated data (124.2). The validated data (124.2) include any amount of data, in any format, and include any type of content.

In one or more embodiments of the invention, the validated metadata (124.4) is a data structure that stores information regarding the validated data (124.2). The validated metadata (124.4) may be similar to metadata regarding data in a data aggregator. The validated metadata (124.4) may include additional information and that included in the metadata without departing from the invention.

In one or more embodiments of the invention, the data deviation report repository (124.6) is a data structure for storing data deviation reports. The data deviation report may be a data structure that includes information regarding whether the validated data (124.2) meets the requirements of the data importation policies (124.8). For example, the data importation policies (124.8) may specify that a particular type of data is to be included in the validated data (124.2). If the particular type of data is not included in the validated data (124.2), a data deviation report may indicate that the validated data (124.2) does not include the particular data. Data deviation reports may include any quantity and type of information regarding differences between the validated data (124.2) and the specifications for the validated data included in the data importation policies (124.8).

In one or more embodiments of the invention, the data importation policies (124.8) specify requirements for the validated data (124.2). The data importation policies (124.8) may specify, for example, content of the validated data, a format of the validated data, a format of the validated metadata, a content of the validated metadata, and/or other characteristics of the validated data and/or validated metadata. The data importation policies (124.8) may be specified at any level of granularity without departing from the invention.

While the persistent storage (124) has been illustrated as including a limited number of data structures that are stored in a specific format, the persistent storage (124) may include additional, different, and/or less data the net illustrated in FIG. 1.3 without departing from the invention. Additionally, while the data structures illustrated in FIG. 1.3 are illustrated as being separate them other types of data, these data structures may be integrated into other data structures; include additional, different, and/or less data the described above; and/or may be subdivided into any number of data structures without departing from the invention. Further, while the data structures illustrated in FIG. 1.3 are shown as being stored in a persistent storage of the data hub (120), these data structures may be stored in other locations (e.g., remote), spanned across any number of computing devices, and/or shared with any number of other entities without departing from the invention.

While the data hub (120) of FIG. 1.3 has been described and illustrated as including a limited number of components for the sake of brevity, a data hub (120) in accordance with embodiments of the invention may include additional, fewer, and/or different components than those illustrated in FIG. 1.3 without departing from the invention.

As discussed above, the data hub dependent data consumers may utilize data from a data hub to generate new data. FIG. 1.4 shows a diagram the data hub dependent consumer A (130.2) in accordance with one or more embodiments of the invention.

In one or more embodiments of the invention, the data hub dependent consumer A (130.2) obtains portions of the validated data (134.2) and generates application data (134.4) using a portion of the validated data (134.2). The portion of the validated data (134.2) may be obtained from the data hub.

To provide the above-noted functionality of the data hub dependent data consumer A (130.2), the data hub dependent data consumer A (130.2) may include application(s) 132 and a persistent storage (134.4). Each of these components of the data aggregator (110) is discussed below.

In one or more embodiments of the invention, the application(s) (132) generate new data using the portion of the validated data (134.2). For example, the application(s) (132) may provide application services that generate application data (134.4). The example of an application service is a database service. As part of providing the database services, reports or other data structures may be generated and provided to clients. The application(s) (132) may provide any type and/or quantity of application services without departing from the invention.

The application(s) (132) may be implemented as physical or logical entities. For example, the application(s) (132) may be implemented using special-purpose hardware or may be implemented as computing instructions stored on a persistent storage that when executed by a processor of the data hub dependent data consumer A (130.2) cause the data hub dependent data consumer A (130.2) the provide the functionality of the application(s) (132).

In one or more embodiments of the invention, execution of the application(s) (132) may trigger the obtaining of the portion of the validated data (134.2). For example, execution of the application(s) (132) may cause a management entity (not shown) to obtain the portion of the validated data (134.2) from a data hub. The execution of the application(s) (132) may specify the content of the portion of the validated data (134.2). By doing so, the management entity may be notified of the desired content and management entity may take action to obtain the desired content, i.e., the portion of the validated data (134.2).

In one or more embodiments of the invention, execution of the application(s) (132) may cause the application(s) (132) to provide portions of the application data (134.4) to clients or other entities. For example, execution of the application(s) (132) may cause the application(s) (132) to generate portions of the application data (134.4) that are relevant to a client, or other entity, that is utilizing the services provided by the application(s) (132). As part of providing application services, the application(s) (132) may provide the generated portions of the application data (134.4) or other data stored in the persistent storage (134).

In one or more embodiments of the invention, the persistent storage (134) is a data storage device. For example, the persistent storage (134) may be any combination of hard disk drives, solid state disk drives, tape drives, and/or any other physical storage medium for the storage of data.

In one or more embodiments of the invention, the persistent storage (134) stores a portion of the validated data (134.2 and/or application data (134.4). Each of these data structures is described below.

In one or more embodiments of the invention, the portion of the validated data (134.2) is a data structure that includes data corresponding to portion of the validated data stored in a data hub. As noted above, execution of the applications may trigger the portion of the validated data (134.2) to be obtained from a data hub.

In one or more embodiments of the invention, the application data (134.4) is a data structure that includes data generated by execution of the application(s) (132). The application data (134.4) may include any quantity and type of data generated by the application(s) (132).

While the persistent storage (134) has been illustrated as including a limited number of data structures that are stored in a specific format, the persistent storage (134) may include additional, different, and/or less data the net illustrated in FIG. 1.4 without departing from the invention. Additionally, while the data structures illustrated in FIG. 1.4 are illustrated as being separate them other types of data, these data structures may be integrated into other data structures; include additional, different, and/or less data the described above; and/or may be subdivided into any number of data structures without departing from the invention. Further, while the data structures illustrated in FIG. 1.4 are shown as being stored in a persistent storage of the data hub dependent data consumer A (130.2), these data structures may be stored in other locations (e.g., remote), spanned across any number of computing devices, and/or shared with any number of other entities without departing from the invention.

While the data hub dependent data consumer A (130.2) of FIG. 1.4 has been described and illustrated as including a limited number of components for the sake of brevity, a data hub dependent data consumer A (130.2) in accordance with embodiments of the invention may include additional, fewer, and/or different components than those illustrated in FIG. 1.4 without departing from the invention. The other data hub dependent data consumers of FIG. 1.1 may be similar to that illustrated in FIG. 1.4.

Returning to FIG. 1.1, the data hub may provide validated data to the data hub dependent data consumers. FIG. 2.1 illustrate methods may be performed by components of the system of FIG. 1.1 when the data hub is providing validated data.

FIG. 2.1 shows a flowchart of a method in accordance with one or more embodiments of the invention. The method depicted in FIG. 2.1 be used to provide validated data in accordance with one or more embodiments of the invention. The method shown in FIG. 2.1 may be performed by, for example, a data hub (e.g., 120, FIG. 1.2). Other components of the system illustrated in FIG. 1.1 may perform all, or a portion, of the method of FIG. 2.1 without departing from the invention.

In step 200, the data validation request is obtained.

In one or more embodiments of the invention, the data validation request is obtained from an application hosted by a data hub dependent data consumer. The request may specify a desired content. For example, request may specify the data by the application provide application services.

In one or more embodiments of the invention, the data validation request is obtained from the data hub. For example, data importation policies hosted by the data hub may specify when and under what conditions data is to be validated. The data importation policies may, for example, specify that data is to be validated periodically, e.g., daily, hourly, weekly, etc.

The data validation request be obtained from other entities without departing from the invention.

In step 202, data from a data aggregator is imported to obtain the validated data.

In one or more embodiments of the invention, the data from the data aggregator is imported in accordance with data importation policies. These policies may include specifications for imported data to be considered validated.

In one or more embodiments of the invention, the data may be imported from the data aggregator to obtain the validated data via the method illustrated in FIG. 2.2. The data may be imported the other methods without departing from the invention.

In step 204, a continuity analysis of the validated data is performed to generate a data deviation report.

In one or more embodiments of the invention, the data deviation report specifies differences between the validated data and data importation policies. For example, consider a scenario in which the data importation policies specify the particular type of data must be imported but the particular data is not imported because of network conductivity issues. In this scenario, the data deviation report indicates that particular type of data is not included in the validated data. In this manner, downstream entities (users of the validated data) may be notified of differences between the validated data and expectations that the downstream entities had for the validated data.

In one or more embodiments of the invention, the continuity analysis is performed via the method illustrated in FIG. 2.3. The continuity analysis may be performed via other methods without departing from the invention.

In step 206, it is determined whether remediation of validated data is required.

In one or more embodiments of the invention, remediation of the validated data is required when the data deviation report indicates at least one difference between the validated data and the data importation policies.

If remediation is required, the method may proceed to step 208. If remediation is not required, the method may proceed to step 210.

In step 208, the validated data is remediated.

In one or more embodiments of the invention, remediation is performed by attempting to import data from the data aggregator corresponding to at least one difference specified by the data deviation report. By attempting to import the data from the data aggregator, the validated data may be adjusted to match the requirements of the data importation policies. The method may proceed to step 204 following step 208.

Returning to step 206, the method may proceed to step 210 following step 206 when remediation is not required.

In step 210, a portion of the validated data is provided to a data hub dependent data consumer.

In one or more embodiments of the invention, a portion of the validated data is provided to the data hub dependent data consumer that requested the portion of the validated data. For example, prior to step 210, the data hub dependent data consumer may have sent a request to the data hub for the portion of the validated data.

In one or more embodiments of the invention, the portion of the validated data is provided to the data hub dependent data consumer via the method illustrated in FIG. 2.4. A portion of the validated data may be provided to the data hub dependent data consumer via other methods without departing from the invention.

The method may end following step 210.

FIG. 2.2 shows a flowchart of a method in accordance with one or more embodiments of the invention. The method depicted in FIG. 2.2 be used to import data from a data aggregator to obtain validated data in accordance with one or more embodiments of the invention. The method shown in FIG. 2.2 may be performed by, for example, a data hub (e.g., 120, FIG. 1.2). Other components of the system illustrated in FIG. 1.1 may perform all, or a portion, of the method of FIG. 2.2 without departing from the invention.

In step 220, a portion of the upstream entity data is obtained based on the data validation request.

In one or more embodiments of the invention, the portion of the upstream entity data is obtained from a data aggregator. The upstream entity data may reflect data from one or more upstream data source entities.

In one or more embodiments of the invention, the portion of the upstream entity data reflects data that has not been previously provided to the data hub. For example, the upstream entity data may include a first portion of data that has been provided to the data hub the second portion of data that has not been provided to the data hub. The portion of the upstream entity data may correspond to the second portion that is not been provided to the data hub. The portion of the upstream entity data may include any quantity of data without departing from the invention. In some scenarios, the portion of the upstream entity data may not include any data.

In step 222, the portion of the upstream entity data is validated against an upstream entity data source entity to both obtain new valid data and generate new validated metadata.

In one or more embodiments of the invention, the portion of the upstream entity data is validated against an upstream entity data source by comparing an identity of upstream entity data source to an approved list of upstream entity data providers. If the upstream entity is not an approved provider, the portion of the upstream entity data may be considered to be invalid.

In one or more embodiments of the invention, the portion of the upstream entity data is validated against an upstream entity data source by comparing the content of the portion of the upstream entity data to an identity of the upstream entity. If the content of the portion of the upstream entity data does not match the identity of the upstream entity, the portion of the upstream entity data may be considered to be invalid. For example, if an upstream entity is a system that generates human data, if the portion of the upstream entity data includes financial projection data the portion of the upstream entity data is likely to be invalid or otherwise untrustworthy.

In one or more embodiments of the invention, the portion of the upstream entity data is validated against an upstream entity data source by comparing a format of the portion of the upstream entity data to an identity of the upstream entity. If the format of the portion of the upstream entity data does not match the identity of the upstream entity, the portion of the upstream entity data may be considered to be invalid.

The portion of the upstream entity data may be validated against an upstream entity data source via other methods without departing from the invention.

In one or more embodiments of the invention, the validated metadata is generated based on the outcome of validation and the content of the portion of the upstream entity data. For example, rich metadata may be generated based on the content of the portion of the upstream entity data. Similarly, flags or other indicators may be included in the validated metadata if all or a portion of the portion of the upstream entity data is considered to be invalid.

In step 224, the validated data and the validated metadata are stored in persistent storage of the data hub.

In one or more embodiments of the invention, the validated data in the validated metadata are stored in the persistent storage the data hub by adding the validated data and validated metadata associated with the portion of the upstream entity data to already present validated data and/or validated metadata from previous importations of data.

The method may end following step 224.

FIG. 2.3 shows a flowchart of a method in accordance with one or more embodiments of the invention. The method depicted in FIG. 2.3 be used to perform a continuity analysis in accordance with one or more embodiments of the invention. The method shown in FIG. 2.3 may be performed by, for example, a data hub (e.g., 120, FIG. 1.2). Other components of the system illustrated in FIG. 1.1 may perform all, or a portion, of the method of FIG. 2.3 without departing from the invention.

In step 230, an analysis of the source data on which the upstream entity data is based is performed to identify a first potential deviation.

In one or more embodiments of the invention, the analysis of the source data is performed by analyzing the content of the source data to infer a likely validity of the upstream entity data. For example, the content, format, and/or other characteristics of the source data may be compared to an identity of the entity that provided the source data. If it is unlikely that the source data was provided by the identified source, the upstream entity data likely includes a deviation, e.g., the first potential deviation.

In step 232, the validated data is analyzed based on an expected data load out to identify a second potential deviation.

In one or more embodiments of the invention, the data importation policies may specify an expected data load out. Expected data load out may be the type and quantity of data expected to be included in the validated data. If the actual validated data does not match the expected data load out, a second potential deviation the identified in that it is likely that the validated data does not include some data that downstream data consumers expect to be present in the validated data.

In step 234, the validated data is analyzed based on parent data to identify the third potential deviation.

As noted above, in many cases data from upstream entities may be flat in that it is not dimensionally scaled along desired dimensions such as, for example, time. Parent data may be considered to be data included in existing validated data before it is imported from a data aggregator. If, after importing data from a data aggregator, there is no new data associated with parent data in the validated data, a third potential deviation may be identified. In other words, the data hub may infer that the lack of new data associated with existing data indicates that a deviation from the data importation policies may have occurred. Parent data lacking associated new data may be identified as deviating.

In step 236 a data deviation report is generated based on, at least in part, the first potential deviation, the second potential deviation, and/or the third potential deviation.

In one or more embodiments of the invention, the data deviation report is generated by populating a prototype data deviation report having a standardized format. The prototype data deviation report may be populated by including one or more of the first, second, and/or third attentional deviation in the prototype data deviation report. Once populated, the prototype data deviation report may be considered to be the data deviation report.

By populating a standardized format prototype data deviation report, other entities of the system of FIG. 1.1 may be officially notified of the deviations by being provided copies of the data deviation report. As noted above, the other entities of the system of FIG. 1.1 may rely on the data hub for data validation services. The data deviation report may notify the other entities variations from expectations with respect to the validated data and provide other entities with appropriate opportunity to modify the workflows to address the deviations included in the validated data.

In step 238, the data deviation report is stored in persistent storage.

One or more embodiments of the invention, the data deviation report is stored in a data deviation report repository. A copy of the data deviation report may be provided to any entity that accesses the validated data. For example, the data deviation reports in the data deviation repository may be associated with different versions, e.g., after different data importation processes are performed, of the validated data.

The method may end following step 238.

FIG. 2.4 shows a flowchart of a method in accordance with one or more embodiments of the invention. The method depicted in FIG. 2.4 be used to provide a portion of the validated data in accordance with one or more embodiments of the invention. The method shown in FIG. 2.4 may be performed by, for example, a data hub (e.g., 120, FIG. 1.2). Other components of the system illustrated in FIG. 1.1 may perform all, or a portion, of the method of FIG. 2.4 without departing from the invention.

In step 240, a data access request for a portion of the validated data is obtained.

In one or more embodiments of the invention, the data access request is obtained from a data hub dependent data consumer. The data access request may specify a portion of the validated data.

In step 424, the deviation analysis of the validated data is performed.

In one or more embodiments of the invention, the deviation analysis is performed by comparing the content of the validated data to an expected content of validated data. Expected content of the validated data be specified by data importation policies, or other data structures.

In step 244, it is determined whether any missing data is present. If any data is missing, the method may proceed to step 248. If no data is missing, the method may proceed to step 246.

In step 246, the portion of the validated data is provided to the requesting entity.

In step 252, metadata associated with the portion of the validated data is provided to the requesting entity.

In one or more embodiments of the invention, the portion of the validated data in the metadata associated with the portion of validated data is provided by sending the data to the requesting entity as part of a single transaction.

The method may end following Step 252.

Returning to step 244, the method may proceed to step 248 if there is any missing data.

In step 248, flags are inserted into any fields corresponding to missing data to obtain a flagged portion of the validated data.

In one or more embodiments of the invention, the portion of the validated data includes any number of fields. Each of the fields may include data. As noted above, basin the deviation analysis may be determined that a portion of the fields are missing data. To notify downstream entities, flags may be inserted into each of the fields that correspond to the missing data. The flags may be, for example, a bit string of a predetermined format. The bit string may be of any length and of any predetermined format. The downstream entities may interpret such flags to mean that expected data is not present in the portion of the validated data. The downstream entities may take action to address the missing data by modifying the manner in which these fields are interpreted, i.e., missing data rather than simply values of 0. The downstream entities may take other actions to address the missing data without departing from the invention.

In step 250, the flight portion of the validated data is provided to the requesting entity.

The method may proceed to Step 252, which is discussed above, following Step 250.

To further clarify embodiments of the invention, a non-limiting example is provided in FIGS. 3.1-3.5. Each of these figures may illustrate a system or data within a system similar to that illustrated in FIG. 1.1 at different points in time during a backup generation process.

Example

Consider a scenario as illustrated in FIG. 3.1 in which a data aggregator (310) is aggregate the data from a manufacturing line sensor (300.2), human resource reporting system (300.4), and the customer portal (300.6). The manufacturing line sensor (300.2) is providing production rate information for aluminum sheets. For example, the manufacturing line sensor (300.2) may be an optical sensor that monitors the rate of the manufacturing line. Customer portal (300.6) may obtain feedback from customers on the quality and other characteristics of the aluminum sheets produced via the manufacturing line. The human resource reporting system (300.4) may provide data with respect to the number of available workers to operate the manufacturing line.

The manufacturing line sensor (300.2) may be newly added. In other words, prior to the point in time illustrated in FIG. 3.1, the data aggregator had not aggregated data from the manufacturing line sensor.

A data hub (320) is validating the data in the data aggregator (310) and providing the validated data to a financial forecasting system (330.2) and a requisition system (330.4). These systems are using the validated data to generate reports and requisitions which are provided to a management system (340.2) and a supplier system (340.4). For example, production reports are being provided to the management system (340.2) and supply requisitions are being provided to the supplier system (340.4). In this manner, the system of FIG. 3.1 provides an integrated workflow in a distributed system that segregates performance of different portions of computations to different components of the system.

FIG. 3.2 shows a diagram of upstream data source entity data (310.2) aggregated by the data aggregator (310, FIG. 3.10). The upstream data source entity data (310.2) includes Q1 employee availability data (314.2) and Q1 customer loyalty data (316.2) obtained from the human resource reporting system (300.4, FIG. 3.1) and customer portal (300.6, FIG. 3.1), respectively.

The upstream data source entity data (310.2) also includes Q2 aluminum sheet production rate (312.4) obtained from the manufacturing line sensor (300.2, FIG. 3.1). The upstream data source entity data (310.2) further includes employee availability data (314.4) and customer loyalty data (316.4) for quarter two.

Based on the upstream data source entity data (310.2) and data importation policies, the data hub (320, FIG. 3.1) generated validated data (320.2) as illustrated in FIG. 3.3 for the second quarter. As seen from FIG. 3.3, only the Q2 aluminum sheet production rate (322.4) was included in the validated data. The other data failed due to a migration failure (320.2) due to a network connectivity problem during import and was unavailable because of a policy compliance failure (320.4).

In response to requests for the validated data from the financial forecasting system (330.2, FIG. 3.1) and the requisition system (330.4, FIG. 3.1), the data hub (320) provides a portion of the validated data (322) as illustrated in FIG. 3.4. The portion of the validated data (322) includes the Q2 aluminum production rate (312.4) and two flags (322.2, 322.4) indicating that the provided portion of the validated data (322) does not include all the expected data. Additionally, the data hub (320, FIG. 3.1) generates and sends a data deviation report (360) as illustrated in FIG. 3.5. The data deviation report (360) includes a flag associated with the Q2 aluminum production rate (312.4, FIG. 3.4) that indicates that no parent is available for the data.

By including the flags in the portion of the validated data and also sending the data deviation report, downstream users of the validated data may be notified of issues with the portion of the validated data. In turn, the downstream entities may take action to remediate the noted issues. In this manner, the system illustrated in FIG. 1.1 and distribute computations across the distributed system in a manner that eliminates redundant performance of computations thereby improving the computing efficiency of the distributed system.

End of Example

Any of the components of FIG. 1.1 may be implemented as distributed computing devices. A distributed computing device may refer to functionality provided by a logical device that utilizes the computing resources of one or more separate and/or distinct computing devices. As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments of the invention may provide an improved method for performing computations in a distributed system. Specifically, embodiments of the invention may provide a distributed system that segregates different portions of the computation two different computing systems within distributed system. By doing so, embodiments of the invention may provide a more efficient distributed computing system. For example, a distributed computing system in accordance with embodiments of the invention may centralize data validation to a first portion of the system and perform computations utilizing the validated data and a second portion of the system. By doing so, a distributed system in accordance with embodiments of the invention may eliminate the need for complicated data validation mechanisms to embedded in all computations. Thus, embodiments of the invention may reduce and/or eliminate the performance of duplicative data validation processes within the distributed system.

Additionally, embodiments of the invention may provide an improved method for performing computations in a distributed system that increase the consistency of the computations. Specifically, embodiments of the invention may provide a distributed system that ensures that all computations are performed on a single, validated data set. By doing so, different computations performed by the system may be more consistent than those performed by contemporary system that do not utilize a single data source for performance of all computations within the distributed system.

Thus, embodiments of the invention may address problems arising in the field the distributed computations that impact both the efficiency of performing such computations in the consistency of the results generated by performing the computations.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data hub for servicing a plurality of data hub dependent data consumers, comprising:
   a persistent storage configured to store data importation policies specifying requirements for validated data; and
   a data validator coupled to the persistent storage and configured to:
   receive a data validation request;
   in response to receiving the data validation request:
   import, based on the data importation policies, data from a data aggregator to obtain the validated data;
   perform a continuity analysis of the validated data to generate a data deviation report,
   wherein the data deviation report specifies differences between the validated data and the data importation policies,
   wherein the data deviation report notifies users, of the validated data, of differences between the validated data and expectations that the users had for the validated data;
   make a determination that remediation of the validated data is required,
   wherein the remediation is required when the data deviation report indicates at least one difference between the validated data and the data importation policies; and
   remediate, based on the determination, the validated data by attempting to import other data from the data aggregator corresponding to the at least one difference indicated by the data deviation report,
   wherein by attempting to import the other data from the data aggregator, the validated data is adjusted to match the requirements specified by the data importation policies.

2. The data hub of claim 1, wherein the data validator is further configured to:
   obtain, from a data hub dependent consumer of the plurality of data hub dependent consumers, a data access request specifying a portion of the validated data;
   perform a deviation analysis of the validated data, the deviation analysis comprising comparing content of the validated data to expected content of the validated data specified by the data importation policies;
   make a second determination, based on the deviation analysis, that missing data is not present between the content of the validated data and the expected content of the validated data; and
   provide, based on the second determination, the portion of the validated data to the data hub dependent consumer.

3. The data hub of claim 2, wherein the data validator is further configured to:
   provide metadata associated with the portion of the validated data to the data hub dependent consumer.

4. The data hub of claim 1, wherein the data validator is further configured to:
   obtain, from a data hub dependent consumer of the plurality of data hub dependent consumers, a data access request specifying a portion of the validated data;
   perform a deviation analysis of the validated data, the deviation analysis comprising comparing content of the validated data to expected content of the validated data specified by the data importation policies;
   make a second determination, based on the deviation analysis, that missing data is present between the content of the validated data and the expected content of the validated data; and
   provide, based on the second determination, a flagged portion of the validated data to the data hub dependent consumer.

5. The data hub of claim 4, wherein the data validator is further configured to:
   prior to providing the flagged portion of the validated data to the data hub dependent consumer:
   insert, within the portion of the validated data, flags in fields therein corresponding to the missing data to obtain the flagged portion of the validated data.

6. The data hub of claim 5, wherein the flags serve to notify the users that at least a subset of the expected content of the validated data is not present in the portion of the validated data.

7. The data hub of claim 4, wherein the data validator is further configured to:
   provide metadata associated with the portion of the validated data to the data hub dependent consumer.

8. A method for servicing a plurality of data hub dependent data consumers, the method comprising:
   receiving a data validation request;
   in response to receiving the data validation request:
   importing, based on data importation policies, data from a data aggregator to obtain validated data,
   wherein the data importation policies specify requirements for the validated data;
   performing a continuity analysis of the validated data to generate a data deviation report,
   wherein the data deviation report specifies differences between the validated data and the data importation policies,
   wherein the data deviation report notifies users, of the validated data, of differences between the validated data and expectations that the users had for the validated data;
   making a determination that remediation of the validated data is required,
   wherein the remediation is required when the data deviation report indicates at least one difference between the validated data and the data importation policies; and
   remediating, based on the determination, the validated data by attempting to import other data from the data aggregator corresponding to the at least one difference indicated by the data deviation report,
   wherein by attempting to import the other data from the data aggregator, the validated data is adjusted to match the requirements specified by the data importation policies.

9. The method of claim 8, the method further comprising:
   obtaining, from a data hub dependent data consumer of the plurality of data hub dependent consumers, a data access request specifying a portion of the validated data;
   performing a deviation analysis of the validated data, the deviation analysis comprising comparing content of the validated data to expected content of the validated data specified by the data importation policies;
   making a second determination, based on the deviation analysis, that missing data is not present between the content of the validated data and the expected content of the validated data; and
   providing, based on the second determination, the portion of the validated data to the data hub dependent data consumer.

10. The method of claim 9, the method further comprising:
provide metadata associated with the portion of the validated data to the data hub dependent data consumer.

11. The method of claim 8, the method further comprising:
obtaining, from a data hub dependent data consumer of the plurality of data hub dependent data consumers, a data access request specifying a portion of the validated data;
performing a deviation analysis of the validated data, the deviation analysis comprising comparing content of the validated data to expected content of the validated data specified by the data importation policies;
making a second determination, based on the deviation analysis, that missing data is present between the content of the validated data and the expected content of the validated data; and
providing, based on the second determination, a flagged portion of the validated data to the data hub dependent data consumer.

12. The method of claim 11, the method further comprising:
prior to providing the flagged portion of the validated data to the data hub dependent data consumer:
inserting, within the portion of the validated data, flags in fields therein corresponding to the missing data to obtain the flagged portion of the validated data.

13. The method of claim 12, wherein the flags serve to notify the users that at least a subset of the expected content of the validated data is not present in the portion of the validated data.

14. The method of claim 11, the method further comprising:
providing metadata associated with the portion of the validated data to the data hub dependent data consumer.

15. A non-transitory computer readable medium comprising computer readable program code, which when executed by a computer processor, enables the computer processor to perform a method for servicing a plurality of data hub dependent data consumers, the method comprising:
receiving a data validation request;
in response to receiving the data validation request:
importing, based on data importation policies, data from a data aggregator to obtain validated data,
wherein the data importation policies specify requirements for the validated data;
performing a continuity analysis of the validated data to generate a data deviation report,
wherein the data deviation report specifies differences between the validated data and the data importation policies,
wherein the data deviation report notifies users, of the validated data, of differences between the validated data and expectations that the users had for the validated data;
making a determination that remediation of the validated data is required,
wherein the remediation is required when the data deviation report indicates at least one difference between the validated data and the data importation policies; and
remediating, based on the determination, the validated data by attempting to import other data from the data aggregator corresponding to the at least one difference indicated by the data deviation report,
wherein by attempting to import the other data from the data aggregator, the validated data is adjusted to match the requirements specified by the data importation policies.

16. The non-transitory computer readable medium of claim 15, the method further comprising:
obtaining, from a data hub dependent data consumer of the plurality of data hub dependent consumers, a data access request specifying a portion of the validated data;
performing a deviation analysis of the validated data, the deviation analysis comprising comparing content of the validated data to expected content of the validated data specified by the data importation policies;
making a second determination, based on the deviation analysis, that missing data is not present between the content of the validated data and the expected content of the validated data; and
providing, based on the second determination, the portion of the validated data to the data hub dependent data consumer.

17. The non-transitory computer readable medium of claim 16, the method further comprising:
providing metadata associated with the portion of the validated data to the data hub dependent data consumer.

18. The non-transitory computer readable medium of claim 15, the method further comprising:
obtaining, from a data hub dependent data consumer of the plurality of data hub dependent data consumers, a data access request specifying a portion of the validated data;
performing a deviation analysis of the validated data, the deviation analysis comprising comparing content of the validated data to expected content of the validated data specified by the data importation policies;
making a second determination, based on the deviation analysis, that missing data is present between the content of the validated data and the expected content of the validated data; and
providing, based on the second determination, a flagged portion of the validated data to the data hub dependent data consumer.

19. The method of claim 1, wherein the data importation policies prevent at least a portion of the data from the data aggregator from being used to generate the validated data.

20. The method of claim 1, wherein the requirements for the validated data specify a particular type of data that is to be included in the validated data.

* * * * *